United States Patent
Derbeko et al.

(10) Patent No.: US 9,448,941 B1
(45) Date of Patent: Sep. 20, 2016

(54) SYSTEM AND METHOD FOR CACHE MANAGEMENT

(71) Applicant: EMC Corporation, Hopkinton, MA (US)

(72) Inventors: Philip Derbeko, Modiin (IL); Anat Eyal, Tel Aviv (IL); Arieh Don, Newton, MA (US); Zvi Gabriel Benhanokh, Tel Aviv (IL); Alex Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 270 days.

(21) Appl. No.: 13/731,415

(22) Filed: Dec. 31, 2012

(51) Int. Cl.
    G06F 12/00     (2006.01)
    G06F 13/00     (2006.01)
    G06F 13/28     (2006.01)
    G06F 12/08     (2016.01)

(52) U.S. Cl.
    CPC .................................. G06F 12/0846 (2013.01)

(58) Field of Classification Search
    CPC ................................................. G06F 12/0846
    See application file for complete search history.

(56) References Cited

U.S. PATENT DOCUMENTS

| | | | | |
|---|---|---|---|---|
| 5,948,062 A * | 9/1999 | Tzelnic | ............... | G06F 11/1435 348/E5.008 |
| 5,953,685 A * | 9/1999 | Bogin | ..................... | G06F 1/206 702/132 |
| 5,987,479 A * | 11/1999 | Oliver | ................... | G06F 3/0608 |
| 6,345,338 B1 * | 2/2002 | Milillo et al. | ................ | 711/137 |
| 6,427,189 B1 * | 7/2002 | Mulla | ................. | G06F 12/0846 710/39 |
| 6,584,080 B1 * | 6/2003 | Ganz et al. | ................... | 370/315 |
| 6,785,786 B1 * | 8/2004 | Gold | ................... | G06F 11/1461 711/162 |
| 6,901,480 B2 * | 5/2005 | Don et al. | ..................... | 711/114 |
| 6,934,798 B2 * | 8/2005 | Regev | .................... | G11C 15/00 365/49.15 |
| 7,111,115 B2 * | 9/2006 | Peters et al. | ................... | 711/112 |
| 7,171,469 B2 * | 1/2007 | Ackaouy | ............. | H04L 67/2852 707/999.01 |
| 7,793,166 B2 * | 9/2010 | Benhanokh et al. | ........... | 714/54 |
| 8,099,565 B2 * | 1/2012 | Seelam | ................... | G06F 3/061 711/118 |
| 8,103,883 B2 * | 1/2012 | Smith | .......................... | 713/193 |
| 8,165,146 B1 * | 4/2012 | Melick et al. | ................. | 370/428 |
| 8,214,621 B2 * | 7/2012 | Obr et al. | ..................... | 711/173 |
| 8,307,190 B2 * | 11/2012 | Yamada | ................... | G06T 1/60 710/316 |

(Continued)

OTHER PUBLICATIONS

Definition of wqrite-back cache, Webopedia, Oct. 18, 2002, retrieved from https://web.archive.org/web/20021018112605/http://www.webopedia.com/TERM/W/write_back_cache.html on Oct. 20, 2014 (1 page).*

(Continued)

*Primary Examiner* — Mark Giardino, Jr.
*Assistant Examiner* — Daniel C Chappell
(74) *Attorney, Agent, or Firm* — Brian J. Colandreo; Mark H. Whittenberger; Holland & Knight LLP

(57) ABSTRACT

A method, computer program product, and computing system for processing one or more data chunks on a host server. The one or more data chunks are destined for storage within a portion of a data array coupled to the host server. The one or more data chunks are stored within a host cache system included within the host server. Storage criteria concerning the portion of a data array is reviewed. The storage criteria includes an array bandwidth allotment that defines a maximum bandwidth between the host server and the portion of the data array. The one or more data chunks are written to the portion of the data array based, at least in part, upon the storage criteria.

21 Claims, 3 Drawing Sheets

(56) References Cited

U.S. PATENT DOCUMENTS

| | | | |
|---|---|---|---|
| 8,627,012 B1* | 1/2014 | Derbeko et al. | 711/135 |
| 8,725,939 B1* | 5/2014 | Clark et al. | 711/112 |
| 8,738,857 B1* | 5/2014 | Clark et al. | 711/118 |
| 8,738,858 B1* | 5/2014 | Clark et al. | 711/118 |
| 2003/0126247 A1* | 7/2003 | Strasser | G06F 11/1458 709/223 |
| 2007/0079083 A1* | 4/2007 | Gladwin et al. | 711/154 |
| 2009/0132621 A1* | 5/2009 | Jensen et al. | 707/205 |
| 2009/0164790 A1* | 6/2009 | Pogodin | 713/176 |
| 2009/0327903 A1* | 12/2009 | Smith et al. | 715/737 |
| 2010/0161916 A1* | 6/2010 | Thornton et al. | 711/154 |
| 2011/0060887 A1* | 3/2011 | Thatcher et al. | 711/171 |
| 2011/0078375 A1* | 3/2011 | Shepherd et al. | 711/115 |
| 2013/0086330 A1* | 4/2013 | Baddepudi | G06F 12/0868 711/143 |
| 2013/0159863 A1* | 6/2013 | Smith et al. | 715/734 |
| 2013/0159864 A1* | 6/2013 | Smith et al. | 715/734 |
| 2013/0159865 A1* | 6/2013 | Smith et al. | 715/737 |
| 2013/0326150 A1* | 12/2013 | Phelan et al. | 711/135 |
| 2014/0143504 A1* | 5/2014 | Beveridge | 711/143 |

OTHER PUBLICATIONS

Aging through cascaded caches: performance issues in the distribution of web content, Cohen et al, Proceedings of the 2001 conference on Applications, technologies, architectures, and protocols for computer communications, Aug. 27-31, 2001, pp. 41-53 (13 pages).*

On expiration-based hierarchical caching systems, Hou et al, IEEE Journal on Selected Areas in Communications, vol. 22, iss. 1, Jan. 7, 2004, pp. 134-150 (17 pages).*

Definition of Fibre Channel, Margaret Rouse, Nov. 2005, retrieved from http://searchstorage.techtarget.com/definition/Fibre-Channel on Oct. 20, 2014 (3 pages).*

Definition of logical unit number (LUN), Margaret Rouse, May 2011, retrieved from http://searchstorage.techtarget.com/definition/logical-unit-number on Oct. 20, 2014 (3 pages).*

Definition of write-back cache, Webopedia, Oct. 18, 2002, retrieved from https://web.archive.org/web/20021018112605/http://www.webopedia.com/TERM/W/write_back_cache.html on Oct. 20, 2014 (1 page).*

* cited by examiner

SYSTEM AND METHOD FOR CACHE MANAGEMENT

TECHNICAL FIELD

This disclosure relates to cache systems and, more particularly, to write back cache systems.

BACKGROUND

Storing and safeguarding electronic content is of paramount importance in modern business. Accordingly, various systems may be employed to protect such electronic content.

Data storage systems may include frontend server devices and backend data arrays that work in concert to store such electronic content in a highly-available fashion. Further, a cache memory system may be utilized in the frontend server devices to enhance system performance by reducing the amount of times that the data array needs to be accessed.

Depending upon the manner in which the cache memory system is configured, the electronic content may be immediately written to the data array (if the cache memory system is configured as a write-through cache) or may subsequently be written to the data array (if the cache memory system is configured as a write-back cache).

SUMMARY OF DISCLOSURE

In one implementation, a computer-implemented method includes processing one or more data chunks on a host server. The one or more data chunks are destined for storage within a portion of a data array coupled to the host server. The one or more data chunks are stored within a host cache system included within the host server. Storage criteria concerning the portion of a data array is reviewed. The storage criteria includes an array bandwidth allotment that defines a maximum bandwidth between the host server and the portion of the data array. The one or more data chunks are written to the portion of the data array based, at least in part, upon the storage criteria.

One or more of the following features may be included. The storage criteria may further include a maximum storage delay that defines a maximum amount of time that the one or more data chunks may be stored within the host cache system before being written to the portion of the data array. The storage criteria may further include a storage device performance indicator that defines a performance level for a storage device associated within the portion of the data array. The storage device may be chosen from the group consisting of a SATA storage device, a fiber channel storage device, and a flash-based storage device.

The one or more data chunks may include a first data chunk and a second data chunk. Writing the one or more data chunks to the portion of the data array may include writing the first data chunk and the second data chunk to the portion of the data array in a write sequence that is based, at least in part, upon the storage criteria. The portion of the data array may include one or more LUNs. The host cache system may be a write back cache system.

In another implementation, a computer program product resides on a computer readable medium that has a plurality of instructions stored on it. When executed by a processor, the instructions cause the processor to perform operations including processing one or more data chunks on a host server. The one or more data chunks are destined for storage within a portion of a data array coupled to the host server. The one or more data chunks are stored within a host cache system included within the host server. Storage criteria concerning the portion of a data array is reviewed. The storage criteria includes an array bandwidth allotment that defines a maximum bandwidth between the host server and the portion of the data array. The one or more data chunks are written to the portion of the data array based, at least in part, upon the storage criteria.

One or more of the following features may be included. The storage criteria may further include a maximum storage delay that defines a maximum amount of time that the one or more data chunks may be stored within the host cache system before being written to the portion of the data array. The storage criteria may further include a storage device performance indicator that defines a performance level for a storage device associated within the portion of the data array. The storage device may be chosen from the group consisting of a SATA storage device, a fiber channel storage device, and a flash-based storage device.

The one or more data chunks may include a first data chunk and a second data chunk. Writing the one or more data chunks to the portion of the data array may include writing the first data chunk and the second data chunk to the portion of the data array in a write sequence that is based, at least in part, upon the storage criteria. The portion of the data array may include one or more LUNs. The host cache system may be a write back cache system.

In another implementation, a computing system includes at least one processor and at least one memory architecture coupled with the at least one processor, wherein the computing system is configured to perform operations including processing one or more data chunks on a host server. The one or more data chunks are destined for storage within a portion of a data array coupled to the host server. The one or more data chunks are stored within a host cache system included within the host server. Storage criteria concerning the portion of a data array is reviewed. The storage criteria includes an array bandwidth allotment that defines a maximum bandwidth between the host server and the portion of the data array. The one or more data chunks are written to the portion of the data array based, at least in part, upon the storage criteria.

One or more of the following features may be included. The storage criteria may further include a maximum storage delay that defines a maximum amount of time that the one or more data chunks may be stored within the host cache system before being written to the portion of the data array. The storage criteria may further include a storage device performance indicator that defines a performance level for a storage device associated within the portion of the data array. The storage device may be chosen from the group consisting of a SATA storage device, a fiber channel storage device, and a flash-based storage device.

The one or more data chunks may include a first data chunk and a second data chunk. Writing the one or more data chunks to the portion of the data array may include writing the first data chunk and the second data chunk to the portion of the data array in a write sequence that is based, at least in part, upon the storage criteria. The portion of the data array may include one or more LUNs. The host cache system may be a write back cache system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
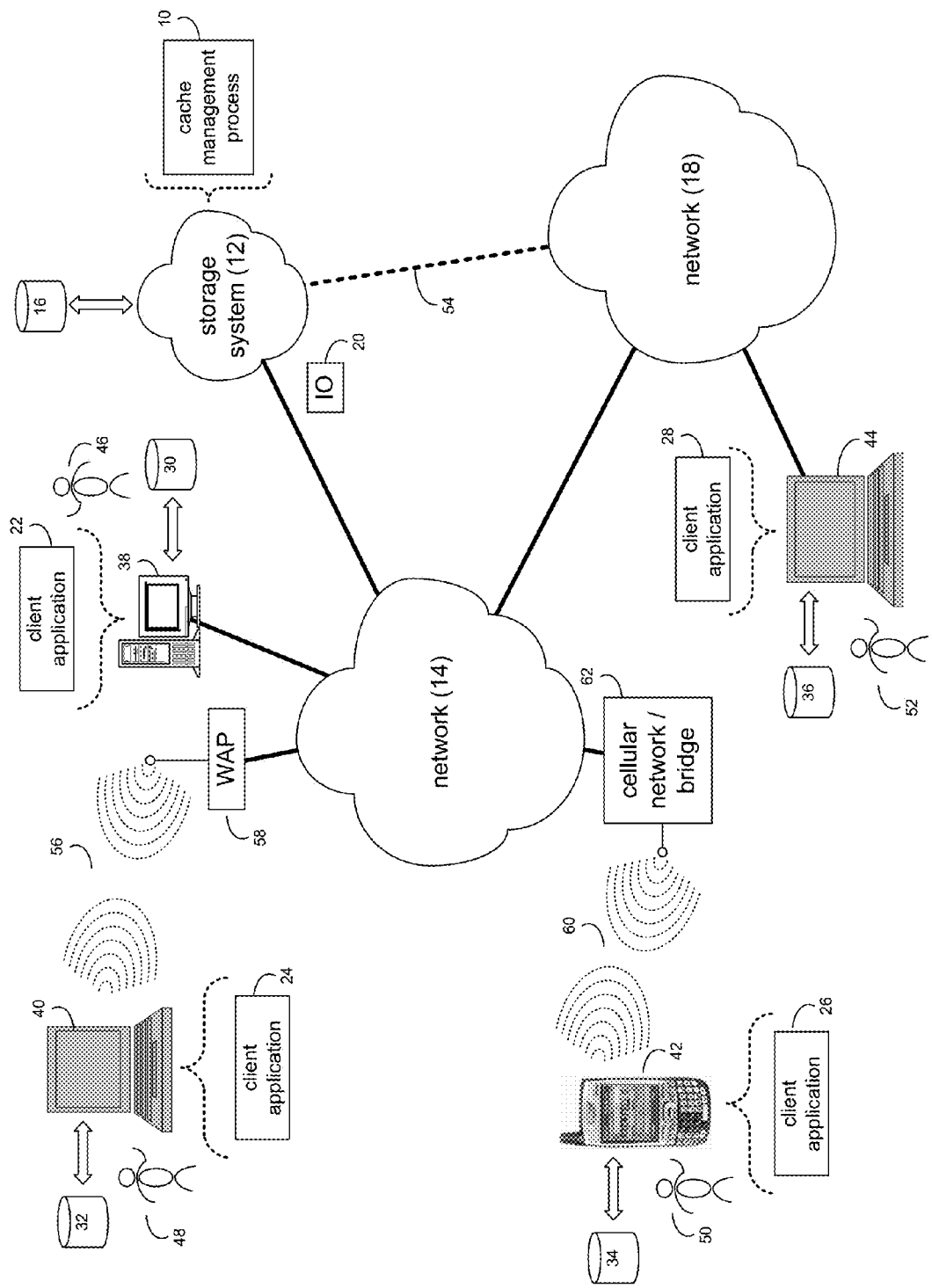
FIG. 1 is a diagrammatic view of a storage system and a cache management process coupled to a distributed computing network.

Referring to FIG. 1, there is shown cache management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™ Unix, or a custom operating system, for example.

The instruction sets and subroutines of cache management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
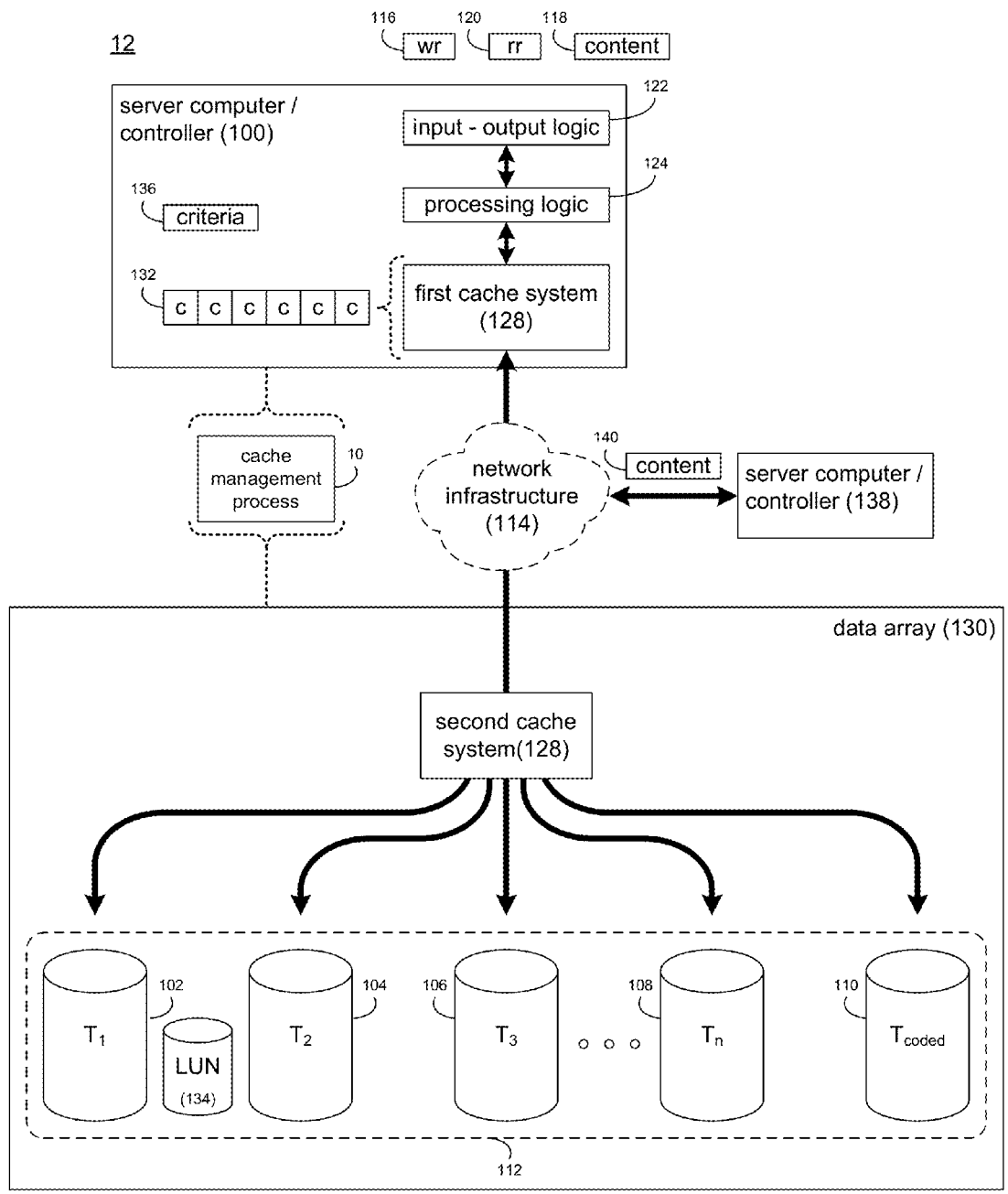
FIG. 2 is a diagrammatic view of the storage system of FIG. 1.

Referring also to FIG. 2, storage system 12 may include a server computer/controller (e.g. server computer/controller 100) and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include but are not limited to one or more electro-mechanical hard disk drives (e.g., SATA storage devices), wherein a combination of storage targets 102, 104, 106, 108 and coded target 110 may form non-volatile, electro-mechanical memory system 112. Other examples may include but are not limited to fiber channel storage devices and flash-based storage devices.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of cache management process 10. The instruction sets and subroutines of cache management process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or an NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of cache management process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of cache management process 10 may be executed by one or more processors (not shown) and one or more memory architectures (not shown) included within data array 130.

The Cache Management Process:

As discussed above and depending upon the manner in which first cache system 126 is configured, processing logic 124 may immediately write content 118 to data array 130 (if first cache system 126 is configured as a write-through cache) or may subsequently write content 118 to data array 130 (if first cache system 126 is configured as a write-back cache). For the following example, assume that first cache system 126 is configured as a write-back cache. Accordingly, data (in the form of data chunks) to be written to data array 130 may be stored within first cache system 126 for a period of time prior to being written to data array 130. Typically, when writing these data chunks to data array 130, a plurality of data chunks may be written during one write operation, thus reducing the number of times that write operations are performed on data array 130.

Figure 3:
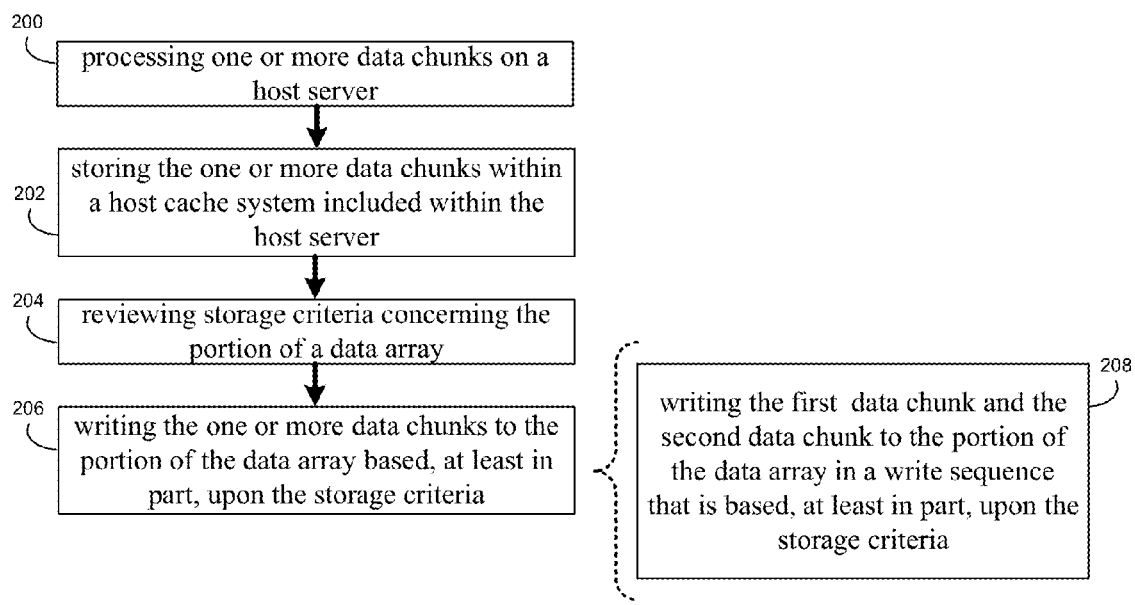
FIG. 3 is a flow chart of one implementation of the cache management process of FIG. 1.

Referring also to FIG. 3, cache management process 10 may process 200 one or more data chunks (e.g., data chunks 132) on a host server (e.g., server computer/controller 100), wherein the data chunks (e.g., data chunks 132) are destined for storage within a portion of data array 130. As discussed above, data array 130 may be coupled to the host server (e.g., server computer/controller 100). Further, the data chunks (e.g., data chunks 132) may be portions of content 118. For example, assume that six write requests were processed by server computer/controller 100, wherein each of the six write requests included a piece of content (as represented by data chunks 132) to be written to data array 130. Since, in this example, first cache system 126 is configured as a write-back cache, each time a piece of content (as represented by one of data chunks 132) to be written to data array 130 is received and processed 200 by server computer/controller 100, the piece of content may not be immediately written to data array 130. Specifically, cache management process 10 may store 202 data chunks 132 within a host cache system (e.g., first cache system 126) included within the host server (e.g., server computer/controller 100) and may subsequently write data chunks 132 to data array 130.

Examples of the portion of data array 130 to which data chunks 132 are to be written may include one or more LUNs (e.g., LUN 134). As is known in the art, a LUN is a logical storage device that may be formed (in this example) within data array 130 from one or more portions of storage targets 102, 104, 106, 108.

Cache management process 10 may review 204 storage criteria (e.g., storage criteria 136) concerning the portion (e.g., LUN 134) of data array 130. As will be discussed below, storage criteria 136 may include: a maximum storage delay that may define a maximum amount of time that one or more of data chunks 132 may be stored within the host cache system (e.g., first cache system 126) before being written to the portion (e.g., LUN 134) of data array 130; an array bandwidth allotment that may define a maximum bandwidth between the host server (e.g., server computer/controller 100) and the portion (e.g., LUN 134) of data array 130; and/or a storage device performance indicator that may define a performance level for a storage device (e.g., storage targets 102, 104, 106, 108) associated within the portion (e.g., LUN 134) of data array 130.

Specially, various criteria may be considered when deciding when and how to write one or more of data chunks 132 to the portion (e.g., LUN 134) of data array 130. Often, the level of access granted to data array 130 (or portions thereof, such as LUN 134) may be administratively regulated.

Therefore, if data array 130 is included within a corporate infrastructure, an administrator (not shown) may configure storage system 12 so that the level of resources consumed with respect to data array 130 (or portions thereof, such as LUN 134) may be controlled. For example, the quantity of data storage consumable by a user of storage system 12 may be adjusted. Accordingly, within storage system 12, LUN 134 may be defined for use by one or more users of storage system 12, wherein LUN 134 has a maximum size (e.g. 100 GB). Further, the rate at which data may be uploaded to or downloaded from LUN 134 may be regulated, thus preventing an individual LUN from consuming a large quantity of the bandwidth of storage system 12. For example, access to LUN 134 may be regulated so that a maximum bandwidth of 500 MB per second is available for download (i.e., read) purposes and a maximum of 100 MB per second is available for upload (i.e., write) purposes.

Alternatively, data array 130 may be storage provided by a storage service provider. Accordingly, data array 130 may not be part of a corporate infrastructure and may be remote storage owned/maintained by a third party that is accessed by (in this example) server computer/controller 100. In such a configuration, the storage service provider may charge e.g., a monthly access fee to the user based upon the quantity of storage needed (e.g., the size of the LUN) and the quantity of bandwidth needed (e.g., maximum upload and download speeds).

For the following example, assume that data array 130 is provided by a storage service provider and LUN 134 was defined within data array 130. Further assume that LUN 134 provides 500 GB of storage capacity and access to LUN 134 is regulated by the storage service provider so that a maximum bandwidth of 500 MB per second is available for data read (i.e., download) purposes and a maximum bandwidth of 100 MB per second is available for data write (i.e., upload) purposes.

As discussed above, various storage criteria may be considered when deciding when and how to write one or more of data chunks 132 to the portion (e.g., LUN 134) of data array 130. Specifically, cache management process 10 may review 204 storage criteria (e.g., storage criteria 136) concerning the portion (e.g., LUN 134) of data array 130. Such storage criteria 136 reviewed 204 may include: a maximum storage delay; an array bandwidth allotment; and/or a storage device performance indicator.

Maximum Storage Delay:

As discussed above and in this example, first cache system 126 is configured as a write-back cache and, therefore, data (in the form of data chunks) to be written to data array 130 may be stored within first cache system 126 for a period of time prior to being written to data array 130. Accordingly, cache management process 10 may be configured to allow an administrator (not shown) to define a maximum amount of time that one or more of data chunks 132 may be stored within the host cache system (e.g., first cache system 126) before being written to the portion (e.g., LUN 134) of data array 130. Specifically, the longer that data chunks 132 are stored within first cache system 126 prior to being stored within data array 130, the higher the risk of data loss in the event of a failure of first cache system 126. However, the longer that data chunks 132 are stored within first cache system 126 prior to being stored within data array 130, the greater the increase in overall system efficiency, as more data chunks may be bundled and written to data array 130 during one write operation. Accordingly, by allowing an administrator (not shown) to define such a maximum storage delay, cache management system 10 allows the administrator (not shown) to balance the risk of data loss with increases in system efficiency.

For example, in the event that the administrator (not shown) defines a maximum storage delay of 10 minutes and a data chunk included within data chunks 132 has been stored within first cache system 126 for longer than 10 minutes and has not yet been written to data array 130, cache management process 10 may write 206 the data chunk (included within data chunks 132) to the portion (e.g., LUN 134) of data array 130 based, at least in part, upon the above-described storage criteria, namely the above-described maximum storage delay.

Further, if multiple data chunks (included within data chunks 132) have been stored within first cache system 126 for longer than 10 minutes and have not yet been written to data array 130, writing 206 the data chunks to data array 130 may include writing 208 a plurality of data chunks to the portion (e.g., LUN 134) of data array 130 in a write sequence that is based, at least in part, upon the above-described storage criteria, namely the above-described maximum storage delay. Accordingly, if a first data chunk (included within data chunks 132) has been stored within first cache system 126 for 11 minutes and a second data chunk (included within data chunks 132) has been stored within first cache system 126 for 12 minutes (without being written to data array 130), cache management system 10 may first write 208 the second data chunk (included within data chunks 132) to data array 130 and may subsequently write the first data chunk (included within data chunks 132) to data array 130, as the second data chunk has been stored within first cache system 126 for a greater amount of time than the first data chunk (without being written to data array 130).

Array Bandwidth Allotment:

As discussed above and for this example, assume that LUN 134 provides 500 GB of storage capacity and access to LUN 134 is regulated by the storage service provider so that a maximum bandwidth of 500 MB per second is available for data read (i.e., download) purposes and a maximum bandwidth of 100 MB per second is available for data write (i.e., upload) purposes. Further, assume that multiple devices (e.g., host servers) have access to LUN 134. For example, assume that a second host server (e.g., server computer/controller 138) also has access to LUN 134 and, therefore, the above described bandwidth limitations have to be shared amongst multiple devices (in this example, server computer/controller 100 and server computer/controller 138).

Assume for illustrative purposes that server computer/controller 138 is currently uploading (i.e., writing) content 140 to data array 130 at a rate of 90 MB per second. Since the maximum bandwidth available for data write (i.e., upload) purposes is 100 MB per second, the remaining bandwidth available for data write (i.e., upload) purposes only 10 MB per second. As will be discussed below, cache management process 10 may consider the size of the data chunk to be written to the portion (e.g., LUN 134) of data array 130 when deciding whether to initiate or delay the writing 206 of the data chunk.

Accordingly, if a data chunk (included within data chunks 132) that is currently stored within first cache system 126 and needs to be written to data array 130 is comparatively small in size, cache management process 10 may write 206 this data chunk to the portion (e.g., LUN 134) of data array 130 based, at least in part, upon the above-described storage criteria, namely the above-described array bandwidth allotment. Specifically, even though only 10 MB of upload bandwidth is currently available, cache management process 10 may write 206 this smaller data chunk to data array 130 since it may not overload the remaining available bandwidth.

However, if a data chunk (included within data chunks 132) that is currently stored within first cache system 126 and needs to be written to data array 130 is comparatively large in size, cache management process 10 may delay writing 206 this larger chunk to data array 130, as this larger data chunk may overload the remaining available bandwidth. Accordingly, cache management process 10 may wait until more data write (i.e., upload) bandwidth is available.

Further, if multiple data chunks (included within data chunks 132) need to be written to data array 130 and are all comparatively small in size, writing 206 the data chunks to data array 130 may include writing 208 a plurality of data chunks to the portion (e.g., LUN 134) of data array 130 in a write sequence that is based, at least in part, upon the above-described storage criteria, namely the above-described array bandwidth allotment. Accordingly, if a first data chunk (included within data chunks 132) is 20 kilobytes in size and a second data chunk (included within data chunks 132) is 10 kilobytes in size, cache management system 10 may first write 208 the second data chunk (included within data chunks 132) to data array 130 and may subsequently write the first data chunk (included within data chunks 132) to data array 130, as the second data chunk stored within first cache system 126 is smaller (10 kilobytes) than the first data chunk (20 kilobytes) stored within first cache system 126.

Storage Device Performance Indicator:

As discussed above, examples of storage targets 102, 104, 106, 108 and coded target 110 may include but are not limited to one or more SATA storage devices, fiber channel storage devices, and flash-based storage devices. And within this group of storage devices: SATA storage devices tend to be the slowest; flash-based storage devices tend to be the fastest; and fiber channel storage devices tend to provide a mid-level of performance.

Accordingly, in the situation in which a high bandwidth usage situation is occurring (as described above), the type of device being written to may be considered by cache management process 10. Specifically, assume again that server computer/controller 138 is currently uploading (i.e., writing) content 140 to data array 130 at a rate of 90 MB per second. As discussed above, since the maximum bandwidth available for data write (i.e., upload) purposes is 100 MB per second, the remaining bandwidth available for data write (i.e., upload) purposes only 10 MB per second.

If the device being written to/read from within data array 130 is a faster device, the above-described high bandwidth usage situation will last for a shorter period of time. Conversely, if the device being written to/read from within data array 130 is a slower device, the above-described high bandwidth usage situation will last for a longer period of time.

Therefore, if a data chunk (included within data chunks 132) is currently stored within first cache system 126 and needs to be written to the portion (e.g., LUN 134) of data array 130, cache management process 10 may allow for the writing 206 of this data chunk to the portion (e.g., LUN 134) of data array 130 based, at least in part, upon the above-described storage criteria, namely the above-described storage device performance indicator. Specifically, cache management process 10 may allow for the further loading of a high bandwidth usage situation if the device being written to/read from within data array 130 is a faster device (such as a flash device). Conversely, if the device being written to/read from within data array 130 is a slower device (such as a SATA device), cache management process 10 may not allow the further loading of the high bandwidth usage situation and may delay the writing 206 of this data chunk.

Further, if multiple data chunks (included within data chunks 132) need to be written to data array 130, writing 206 the data chunks to data array 130 may include writing 208 a plurality of data chunks to the portion (e.g., LUN 134) of data array 130 in a write sequence that is based, at least in part, upon the above-described storage criteria, namely the above-described storage device performance indicator. Accordingly, if a first data chunk (included within data chunks 132) is being written to a slower device and a second data chunk (included within data chunks 132) is being written to a faster device, cache management system 10 may first write 208 the second data chunk (included within data chunks 132) to data array 130 and may delay the writing of the first data chunk (included within data chunks 132) to data array 130.

When reviewing 204 storage criteria 136, cache management process 10 may first consider the maximum storage delay; may subsequently consider the array bandwidth allotment; and may finally consider the storage device performance indicator.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    processing one or more data chunks on a host server, wherein the one or more data chunks are to be stored within a portion of a data array, wherein the data array is coupled to the host server;
    storing the one or more data chunks within a host cache system included within the host server;
    reviewing storage criteria concerning the portion of a data array, wherein the storage criteria includes an array bandwidth allotment that is a maximum bandwidth between the host server and the portion of the data array;
analyzing the one or more data chunks to determine a comparative size;
    determining an associated device speed for the portion of the data array to which each of the one or more data chunks is to be written;
    establishing a write sequence for the one or more data chunks, wherein the write sequence is based, at least in part, upon the comparative size of the one or more data chunks and the associated device speed; and
    writing the one or more data chunks from the host cache system to the portion of the data array based, at least in part, upon the storage criteria, including writing the one or more data chunks from the host cache system to the portion of the data array if bandwidth exists of the maximum bandwidth between the host server and the portion of the data array, and if bandwidth does not exist of the maximum bandwidth between the host server and the portion of the data array, then modifying the write sequence based, at least in part, upon the array bandwidth allotment;
    wherein writing the one or more data chunks to the portion of the data array based, at least in part, upon the storage criteria includes writing the one or more data chunks from the host cache system to the portion of the data array in an order based upon, at least in part, an amount of time the one or more data chunks have been stored within the host cache system.

2. The computer-implemented method of claim 1 wherein the storage criteria further includes a maximum storage delay that is a maximum amount of time that the one or more data chunks may be stored within the host cache system before being written to the portion of the data array.

3. The computer-implemented method of claim 1 wherein the storage criteria further includes a storage device performance indicator that is a performance level for a storage device associated within the portion of the data array.

4. The computer-implemented method of claim 3 wherein the storage device is chosen from the group consisting of a SATA storage device, a fiber channel storage device, and a flash-based storage device.

5. The computer-implemented method of claim 1 wherein:
    the one or more data chunks includes a first data chunk and a second data chunk, and
    writing the one or more data chunks to the portion of the data array includes:
        writing the first data chunk and the second data chunk to the portion of the data array in the write sequence that is further based, at least in part, upon the storage criteria.

6. The computer-implemented method of claim 1 wherein the portion of the data array includes one or more LUNs.

7. The computer-implemented method of claim 1 wherein the host cache system is a write back cache system.

8. A computer program product residing on a non-transitory computer readable medium having a plurality of instructions stored thereon which, when executed by a processor, cause the processor to perform operations comprising:
    processing one or more data chunks on a host server, wherein the one or more data chunks are to be stored within a portion of a data array, wherein the data array is coupled to the host server;
    storing the one or more data chunks within a host cache system included within the host server;
    reviewing storage criteria concerning the portion of a data array, wherein the storage criteria includes an array bandwidth allotment that is a maximum bandwidth between the host server and the portion of the data array;
    analyzing the one or more data chunks to determine a comparative size;
determining an associated device speed for the portion of the data array to which each of the one or more data chunks is to be written;
    establishing a write sequence for the one or more data chunks, wherein the write sequence is based, at least in part, upon the comparative size of the one or more data chunks and the associated device speed; and
    writing the one or more data chunks from the host cache system to the portion of the data array based, at least in part, upon the storage criteria, including writing the one or more data chunks from the host cache system to the portion of the data array if bandwidth exists of the maximum bandwidth between the host server and the portion of the data array, and if bandwidth does not exist of the maximum bandwidth between the host server and the portion of the data array, then modifying the write sequence based, at least in part, upon the array bandwidth allotment;

wherein writing the one or more data chunks to the portion of the data array based, at least in part, upon the storage criteria includes writing the one or more data chunks from the host cache system to the portion of the data array in an order based upon, at least in part, an amount of time the one or more data chunks have been stored within the host cache system.

9. The computer program product of claim 8 wherein the storage criteria further includes a maximum storage delay that is a maximum amount of time that the one or more data chunks may be stored within the host cache system before being written to the portion of the data array.

10. The computer program product of claim 8 wherein the storage criteria further includes a storage device performance indicator that is a performance level for a storage device associated within the portion of the data array.

11. The computer program product of claim 10 wherein the storage device is chosen from the group consisting of a SATA storage device, a fiber channel storage device, and a flash-based storage device.

12. The computer program product of claim 8 wherein:
the one or more data chunks includes a first data chunk and a second data chunk, and
the instructions for writing the one or more data chunks to the portion of the data array include instructions for:
writing the first data chunk and the second data chunk to the portion of the data array in the write sequence that is further based, at least in part, upon the storage criteria.

13. The computer program product of claim 8 wherein the portion of the data array includes one or more LUNs.

14. The computer program product of claim 8 wherein the host cache system is a write back cache system.

15. A computing system including at least one processor and at least one memory architecture coupled with the at least one processor, wherein the computing system is configured to perform operations comprising:
processing one or more data chunks on a host server, wherein the one or more data chunks are to be stored within a portion of a data array, wherein the data array is coupled to the host server;
storing the one or more data chunks within a host cache system included within the host server;
reviewing storage criteria concerning the portion of a data array, wherein the storage criteria includes an array bandwidth allotment that is a maximum bandwidth between the host server and the portion of the data array;
analyzing the one of more data chunks to determine a comparative size;
determining an associated device speed for the portion of the data array to which each of the one or more data chunks is to be written;
establishing a write sequence for the one or more data chunks, wherein the write sequence is based, at least in part, upon the comparative size of the one or more data chunks and the associated device speed; and
writing the one or more data chunks from the host cache system to the portion of the data array based, at least in part, upon the storage criteria, including writing the one or more data chunks from the host cache system to the portion of the data array if bandwidth exists of the maximum bandwidth between the host server and the portion of the data array, and if bandwidth does not exist of the maximum bandwidth between the host server and the portion of the data array, then modifying the write sequence based, at least in part, upon the array bandwidth allotment;

wherein writing the one or more data chunks to the portion of the data array based, at least in part, upon the storage criteria includes writing the one or more data chunks from the host cache system to the portion of the data array in an order based upon, at least in part, an amount of time the one or more data chunks have been stored within the host cache system.

16. The computing system of claim 15 wherein the storage criteria further includes a maximum storage delay that is a maximum amount of time that the one or more data chunks may be stored within the host cache system before being written to the portion of the data array.

17. The computing system of claim 15 wherein the storage criteria further includes a storage device performance indicator that is a performance level for a storage device associated within the portion of the data array.

18. The computing system of claim 17 wherein the storage device is chosen from the group consisting of a SATA storage device, a fiber channel storage device, and a flash-based storage device.

19. The computing system of claim 15 wherein:
the one or more data chunks includes a first data chunk and a second data chunk, and
writing the one or more data chunks to the portion of the data array includes:
writing the first data chunk and the second data chunk to the portion of the data array in the write sequence that is further based, at least in part, upon the storage criteria.

20. The computing system of claim 15 wherein the portion of the data array includes one or more LUNs.

21. The computing system of claim 15 wherein the host cache system is a write back cache system.

* * * * *